US012383452B2

(12) United States Patent
Lee et al.

(10) Patent No.: US 12,383,452 B2
(45) Date of Patent: Aug. 12, 2025

(54) LUMBAR RETRACTOR

(71) Applicant: Korea University Research and Business Foundation, Seoul (KR)

(72) Inventors: Sang Heon Lee, Seoul (KR); Nack Hwan Kim, Seoul (KR); Chul Hwan Jang, Seoul (KR); Se Jun Oh, Seoul (KR); In Beom Kim, Seoul (KR); Kyung Hee Han, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 629 days.

(21) Appl. No.: 17/776,538

(22) PCT Filed: Nov. 18, 2019

(86) PCT No.: PCT/KR2019/015728
§ 371 (c)(1),
(2) Date: May 12, 2022

(87) PCT Pub. No.: WO2021/095949
PCT Pub. Date: May 20, 2021

(65) Prior Publication Data

US 2022/0378643 A1 Dec. 1, 2022

(30) Foreign Application Priority Data

Nov. 15, 2019 (KR) ........................ 10-2019-0146781

(51) Int. Cl.
*A61H 1/02* (2006.01)

(52) U.S. Cl.
CPC ......... *A61H 1/0218* (2013.01); *A61H 1/0292* (2013.01); *A61H 2201/0103* (2013.01);
(Continued)

(58) Field of Classification Search
CPC ...... A61H 1/008; A61H 1/005; A61H 1/0222; A61H 1/0237; A61H 1/0292;
(Continued)

(56) References Cited

U.S. PATENT DOCUMENTS 7,204,814 B2 * 4/2007 Peles .................... A61H 1/0277 601/5
9,687,406 B1 * 6/2017 Steiner ................. A61H 1/0218
(Continued)

FOREIGN PATENT DOCUMENTS

DE 0450423 A1 * 10/1991
JP 2014128720 A 7/2014
(Continued)

OTHER PUBLICATIONS

EP 0450423 A1 (Year: 1991).*

*Primary Examiner* — Timothy A Stanis
*Assistant Examiner* — Kira B Daher
(74) *Attorney, Agent, or Firm* — Downs Rachlin Martin PLLC

(57) ABSTRACT

A lumbar retractor according to an embodiment comprises: a first fixing part for fixing the user's lumbar regions; a second fixing part for fixing the user's pelvic regions; and a connection part disposed between the first fixing part and the second fixing part to connect the first fixing part and the second fixing part, wherein the distance between the first fixing part and the second fixing part can be adjusted by changing the length of the connection part, and the first fixing part can press each of a plurality of segments of the user's lumbar regions individually.

5 Claims, 4 Drawing Sheets

(52) U.S. Cl.
CPC ................ *A61H 2201/1621* (2013.01); *A61H 2201/163* (2013.01); *A61H 2203/0456* (2013.01)

(58) Field of Classification Search
CPC .......... A61H 9/0078; A61H 2201/0103; A61H 2201/1621; A61H 2201/163; A61H 2203/0456; A61H 2201/0157; A61H 2201/0192; A61H 2001/0233; A61H 2205/081; A61H 1/0218–0296; A61H 2201/0173–018; A61H 2201/1246; A61H 2201/1671; A61H 2201/5056; A61H 2201/5064; A61F 5/04
See application file for complete search history.

(56) References Cited

U.S. PATENT DOCUMENTS

| | | | | | |
|---|---|---|---|---|---|
| 10,406,397 | B1 * | 9/2019 | Graham | A61F 5/05883 | |
| 2005/0010145 | A1 * | 1/2005 | Fenkell | A61H 1/0218 | 601/102 |
| 2006/0224097 | A1 * | 10/2006 | Bass | A61H 1/0296 | 602/32 |
| 2007/0093367 | A1 * | 4/2007 | Walton | A61H 7/001 | 482/142 |
| 2007/0293796 | A1 * | 12/2007 | Graham | A61H 1/0292 | 602/19 |
| 2009/0259253 | A1 * | 10/2009 | Bensoussan | A61H 1/0292 | 606/242 |
| 2010/0280548 | A1 * | 11/2010 | Yen | A61H 1/0292 | 128/845 |
| 2013/0184615 | A1 * | 7/2013 | Johnson | A61H 1/0296 | 601/18 |
| 2014/0309693 | A1 * | 10/2014 | Zhang | A61H 1/00 | 606/239 |
| 2016/0193098 | A1 * | 7/2016 | Nichols | A61G 13/121 | 602/32 |
| 2019/0358112 | A1 * | 11/2019 | Grens | A47C 7/402 | |
| 2021/0059886 | A1 * | 3/2021 | Yoon | A61B 5/107 | |

FOREIGN PATENT DOCUMENTS

| | | | |
|---|---|---|---|
| KR | 20010099099 | A | 11/2001 |
| KR | 20100132279 | A | 12/2010 |
| KR | 200455195 | Y1 | 8/2011 |
| KR | 20120100613 | A | 9/2012 |
| KR | 20140071164 | A | 6/2014 |
| KR | 20180055624 | A | 5/2018 |
| KR | 20190066485 | A | 6/2019 |

* cited by examiner

LUMBAR RETRACTOR

TECHNICAL FIELD

The following description relates to a lumbar retractor.

BACKGROUND ART

The spine is made up of 7 cervical vertebrae, 5 thoracic vertebrae, sacral vertebrae, and coccygeal vertebra, and there exist intervertebral discs between vertebrae to support the spine. The intervertebral disc includes the annulus fibrosus of a round structure and the nucleus pulposus in the center thereof and the outer side of the annulus fibrosus is covered with ligaments, and is sealed and sandwiched between the upper and lower bones.

In modern society, lumbar disease is increasing. This is because poor posture is promoted in daily life with the spread and expansion of smart devices such as computers, smartphones, and tablet PCs.

In particular, lumbar stenosis is a representative degenerative disease of the spine along with disc herniation, which causes low back pain or symptoms of lower extremities due to compression of the neural tube and nerve root.

As such, spinal orthosis for protecting the spine is being developed in various ways, and in general, a spinal orthosis according to a related art helps the movement of the spine and basically focuses on protecting the spine by inhibiting the movement of the body rather than displacing the force.

In addition, wearing a spinal orthosis protects muscles and joints of a damaged spine, relieves pain, protects weak muscles to prevent and correct degenerative diseases, and relaxes muscles and supports the trunk, but there is an issue in that it is not possible to accurately check the effects of spine alignment.

In addition, in lumbar disc herniation, the intervertebral disc between the bones is aged or abruptly displaced from its original position due to a load, which presses the nerve and causes pain.

In severe cases of such disc herniation, surgery is performed, but in most cases, physical therapy is used for treatment. The physical therapy is a traction treatment method, and according to a related art, a method of extending the spine by fixing the upper body including the chest of the patient to a bed, using a pulley to hang a heavy weight on the leg, and pulling the pelvis by gravity has been used.

Since the spinal traction according to a related art is operated by a motor, differentiated power cannot be transmitted depending on the person's body shape and body type regarding the operation of the motor, and there has been a issue that if the power of the motor is turned off after traction of the spine for a certain period of time, the power is no longer transmitted and the effect of traction therapy is reduced. In addition, since electricity must be supplied, there has been issues such as limited use of the place, and the easy failure of the motor.

In addition, in the spinal traction according to a related art, despite the fact that the buttocks protrude lower than the upper body when the human body structure is lying down, the transfer plate and the fixed plate are formed flat, so that if treatment is performed for a long time, a part of the spine is lifted by the protruding part of the buttocks, causing discomfort to the patient as well as reducing the effectiveness of the treatment, and when the pressure of the cylinder is maintained for a certain period of time after traction of the spine, the treatment is performed to restore the intervertebral disc, but over time, the cells of the human body are somewhat elongated causing an issue of reduced treatment effect.

A lumbar traction is disclosed in Korean Patent Application Publication No. 2001-0099099 (published on Nov. 9, 2001).

DISCLOSURE OF THE INVENTION

Technical Goals

An aspect provides a lumbar retractor capable of tracting a user's lumbar while simultaneously applying individually controlled compression to each segment of the user's thoracic vertebrae.

An aspect provides a lumbar retractor that automatically searches for a time point of inducing pain which may not be specified by the user, and reduces a traction force for the lumbar when the time point of inducing pain is reached.

An aspect provides a lumbar retractor which has a compact volume and structure, making it possible to be carried easily and to be used at home.

According to an aspect, there is provided a lumbar retractor including a first fixer configured to fix a thoracic region of a user, a second fixer configured to fix a pelvic region of the user, and a connector disposed between the first fixer and the second fixer and configured to connect the first fixer and the second fixer, wherein a distance between the first fixer and the second fixer is adjustable as a length of the connector is changed, and the first fixer is configured to be capable of pressing individually a plurality of segments of a thoracic vertebrae of the user, respectively.

The first fixer may include a first base configured to support the thoracic vertebrae of the user, a plurality of first tubes disposed on the first base and capable of being disposed respectively at positions corresponding to the plurality of segments of the thoracic vertebrae of the user, and a first belt configured to extend from both sides of the plurality of first tubes to fix an upper body of the user.

Here, the plurality of first tubes may be individually expandable or contractable by air pressure, respectively.

The second fixer may include a second base configured to support a pelvis of the user, a plurality of second tubes disposed on the second base and capable of being disposed respectively at positions corresponding to a left pelvis and a right pelvis of the user, and a second belt configured to extend from both sides of the plurality of second tubes to fix the pelvis of the user.

Here, the plurality of second tubes may be individually expandable or contractable by air pressure, respectively.

The lumbar retractor may further include a controller configured to be capable of controlling air pressure in the first tube and the second tube.

The controller may be configured to be capable of pressing only a specific segment among the segments of the thoracic vertebrae of the user by expanding some of the plurality of first tubes and deflating the rest according to the user's selection, and controlling individually degrees of expansion of the plurality of second tubes disposed below the left pelvis and the right pelvis of the user according to the user's selection.

Further, the lumbar retractor may further include an actuator disposed to connect a lower side of the first fixer and a lower side of the second fixer, a sensor configured to sense the length of the connector which is changed by extension of the distance between the first fixer and the second fixer by the actuator, and a determinator configured to determine a time point when the user feels pain due to a traction force on lumbar of the user provided by the extension of the distance between the first fixer and the second fixer by the actuator.

Here, the determinator may be configured to determine a time point when the length of the connector sensed by the sensor is no longer extended compared to the traction force of a predetermined value provided by the actuator as the time point when the user feels pain.

Further, the controller may be configured to reduce or stop the traction force by controlling an operation of the actuator when the time point when the user feels pain is determined by the determinator.

Furthermore, the lumbar retractor may further include a mover disposed at a lower side of the second fixer and configured to rotate against the ground to be able to move the lumbar retractor.

Advantageous Effects

A lumbar retractor according to an example embodiment may tract the lumbar of the user while applying individually controlled compression to each segment of the user's thoracic vertebrae.

A lumbar retractor according to an example embodiment may automatically search for a time point of inducing pain which may not be specified by the user, and may reduce the traction force for the lumbar when the time point of inducing pain is reached.

A lumbar retractor according to an example embodiment has a simplified volume and structure, making it possible to be carried easily and to be used at home.

BEST MODE FOR CARRYING OUT THE INVENTION

Figure 1:
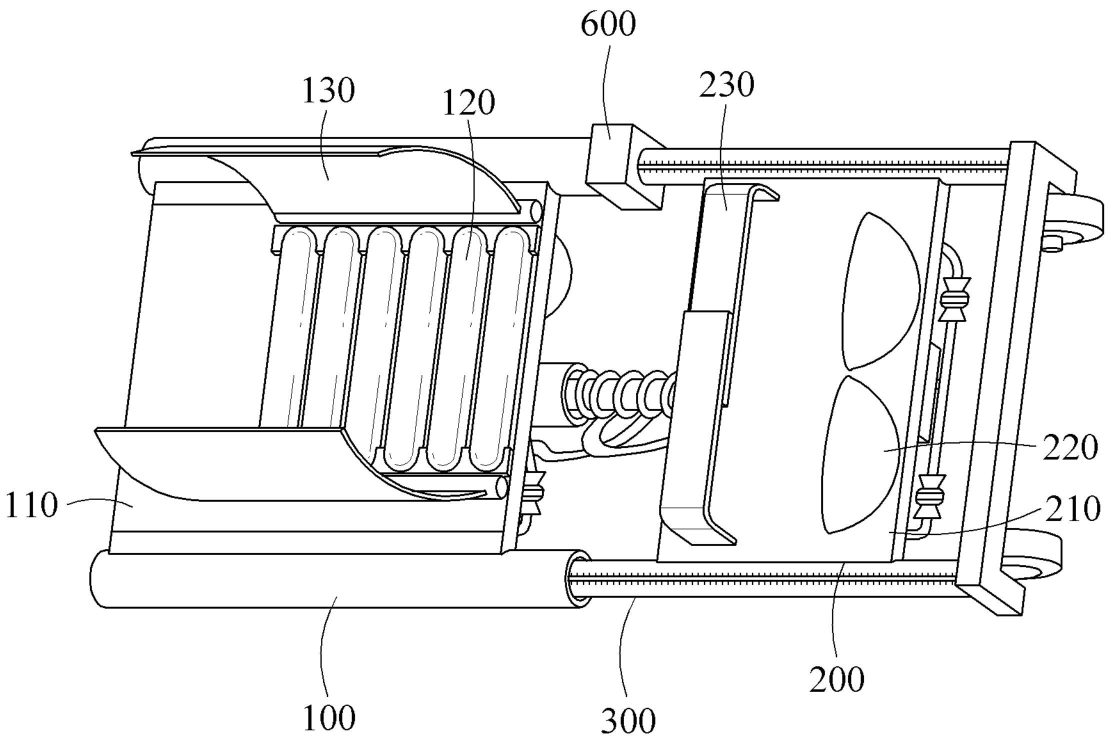
FIG. 1 is a diagram illustrating an upper side of a lumbar retractor according to an example embodiment.

Hereinafter, embodiments will be described in detail with reference to the accompanying drawings. One of many aspects of example embodiments is described hereinafter, and the following description forms a part of the detailed description of the example embodiments.

However, in describing an example embodiment, a detailed description of a well-known function or configuration will be omitted in order to clarify the gist of the disclosure.

In addition, terms or words used herein and claims should not be construed in conventional or dictionary meanings, and based on the principle that the inventor may appropriately define the concept of a term in order to best describe the disclosure, the term should be construed as a meaning and concept consistent with the technical idea of a lumbar retractor according to an example embodiment.

Therefore, the example embodiments described herein and configurations shown in the drawings are intended merely to present most preferred example embodiments of the lumbar retractor according to an example embodiment, which does not represent all the technical ideas of the lumbar retractor according to an example embodiment, and thus should be understood that various equivalents and modifications may be substituted for them at the time of filing the present application.

Figure 2:
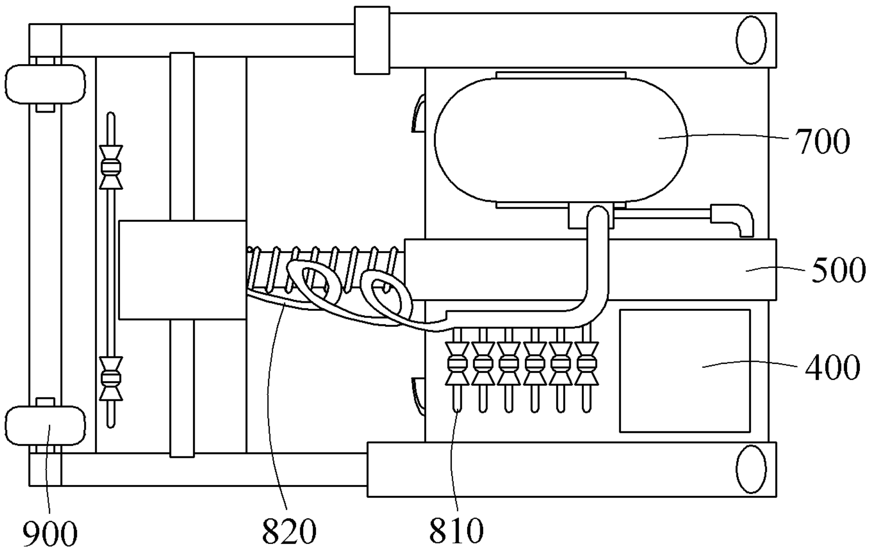
FIG. 2 diagram illustrating a lower side of a lumbar retractor according to an example embodiment.
Figure 3:
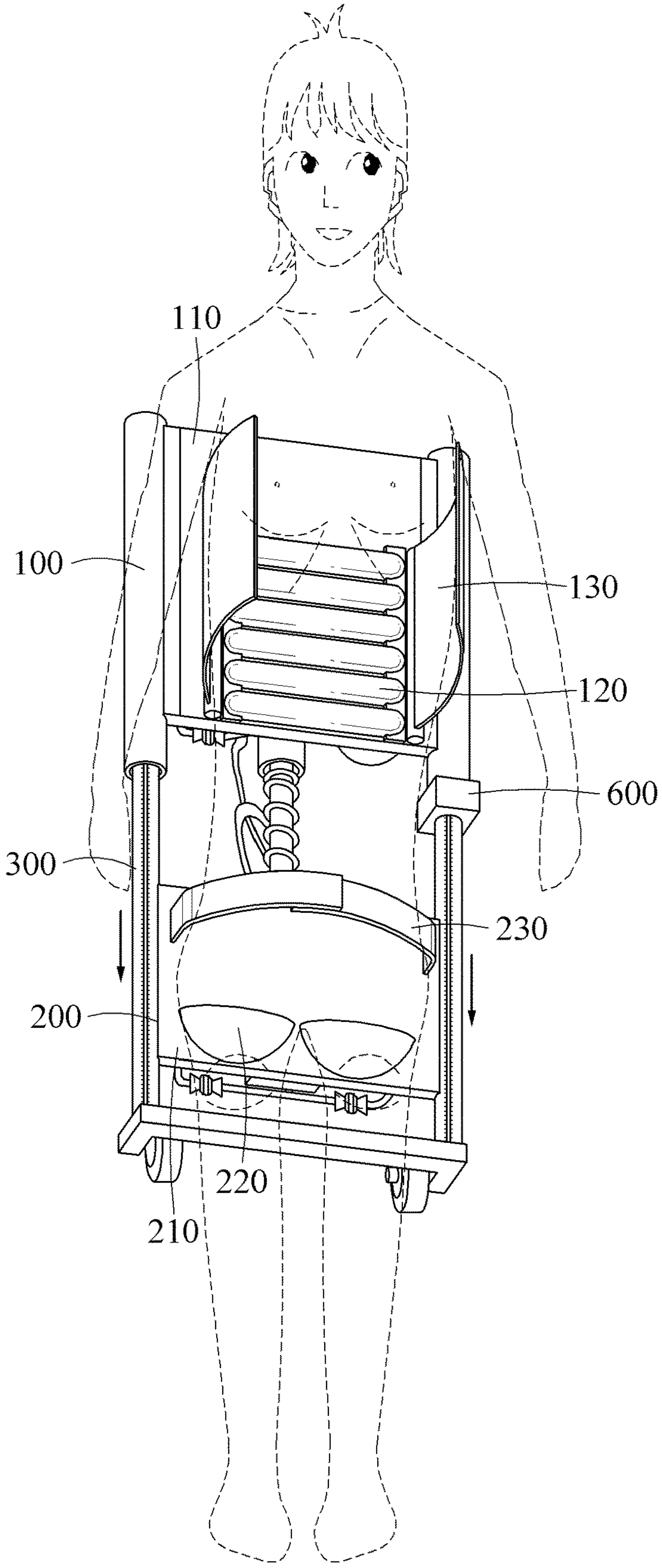
FIGS. 3 and 4 diagrams illustrating an operating state of a lumbar retractor according to an example embodiment.
Figure 4:
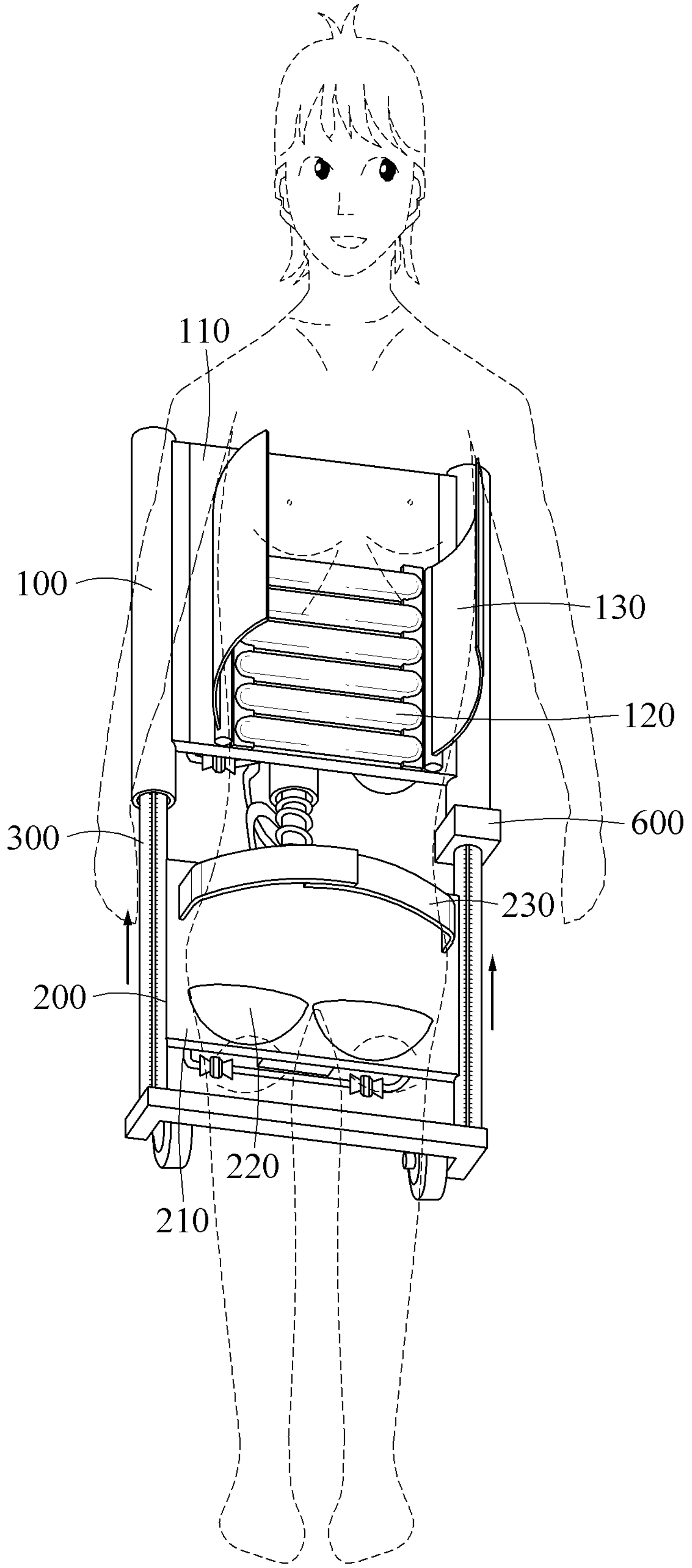

FIG. 1 is a diagram illustrating an upper side of a lumbar retractor according to an example embodiment, and FIG. 2 is a diagram illustrating a lower side of a lumbar retractor according to an example embodiment. FIGS. 3 and 4 are diagrams illustrating an operating state of a lumbar retractor according to an example embodiment.

Referring to FIG. 1, a lumbar retractor according to an example embodiment may include a first fixer 100 configured to fix a thoracic region of a user, a second fixer 200 configured to fix a pelvic region of the user, a connector 300 configured to be disposed between the first fixer and the second fixer to connect the first fixer and the second fixer, and a sensor 600 configured to sense a length of the connector 300 which is changed by extension of a distance between the first fixer and the second fixer by an actuator which is to be described later.

Here, a distance between the first fixer and the second fixer can be adjusted as a length of the connector is changed, and the first fixer is capable of individually pressing a plurality of segments of a thoracic vertebrae of the user, respectively.

Specifically, the first fixer 100 may include a first base 110 configured to support the thoracic vertebrae of the user, a plurality of first tubes 120 configured to be disposed on the first base and which can be respectively disposed at positions corresponding to the plurality of segments of the thoracic vertebrae of the user, and a first belt 130 configured to extend from both sides of the plurality of first tubes to fix an upper body of the user.

Such a plurality of first tubes 120 may each be individually expanded or contracted by air pressure. In other words, as only some of the first tubes are expanded according to the user's selection, a specific segment among the thoracic vertebrae of the user may be targeted and pressurized.

Further, the second fixer 200 may include a second base 210 configured to support a pelvis of the user, a plurality of second tubes 220 configured to be disposed on the second base and which can be respectively disposed at positions corresponding to a left pelvis and a right pelvis of the user, and a second belt 230 configured to extend from both sides of the plurality of second tubes to fix the pelvis of the user.

Such a plurality of second tubes may each be individually expanded or contracted by air pressure. In other words, the two second tubes may be simultaneously expanded or asymmetrically expanded according to the user's selection.

Referring to FIG. 2, a lumbar retractor may further include an actuator 500 configured to be disposed to connect a lower side of the first fixer and a lower side of the second fixer, a pressure motor 700 configured to be disposed at the lower side of the first fixer, a first pneumatic valve 810 configured to connect the pressure motor and the first tube, a second pneumatic valve 820 configured to connect the pressure motor and the second tube, a controller 400 configured to be capable of controlling the air pressure in the first tube and the second tube, and a determinator (not shown) configured to determine a time point when the user feels pain due to a traction force on lumbar of the user provided by the extension of the distance between the first fixer and the second fixer by the actuator.

Here, the controller 400 may press only a specific segment among the segments of the thoracic vertebrae of the user by expanding some of the plurality of first tubes and deflating the rest according to the user's selection, and individually control degrees of expansion of the plurality of second tubes disposed below the left pelvis and the right pelvis of the user according to the user's selection.

Further, the determinator may determine a time point when the length of the connector sensed by the sensor is no longer extended compared to the traction force of a certain value provided by the actuator as the time point when the user feels pain.

As such, the controller may reduce or stop the traction force by controlling an operation of the actuator when the time point when the user feels pain is determined by the determinator.

Through this mechanism, it is possible to preemptively determine the time point when the user may feel pain based on the user's body change data before the user feels great sensory pain when using the lumbar retractor, and thus prevent the pain of the user in advance by reducing or stopping the traction force.

In addition, the lumbar retractor may further include a mover 900 configured to be disposed at the lower side of the second fixer and rotated against ground to be able to move the lumbar retractor.

Therefore, the length of the connector 300 may be contracted so that the lumbar retractor may slide with respect to the ground using the mover in a state in which the first fixer and the second fixer are in contact and the volume of the lumbar retractor is minimized. Accordingly, it is easy to carry and store the lumbar retractor according to an example embodiment at home.

Using a lumbar retractor having such a configuration, the lumbar of the user may be tracted by pressing a specific portion of the segments of the user's thoracic vertebrae and tracting it to the lower side of the user's pelvis in a fixed state as shown in FIG. 3.

If the length of the connector sensed by the sensor is no longer extended even though the traction force of a certain value is continuously provided, the time point may be determined as the time point wherein the user may feel pain, and the traction force may be reduced or stopped.

Thereafter, the traction force may be released by moving the second fixer in a direction closer to the first fixer again as shown in FIG. 4.

A lumbar retractor according to an example embodiment including the above described configuration may tract the user's lumbar while applying individually controlled compression to each segment of the user's thoracic vertebrae, and automatically search for a time point of inducing pain that may not be specified by the user and reduce the traction force for the lumbar when the time point of inducing pain is reached.

In addition, the lumbar retractor has a compact volume and structure, making it possible to be carried easily and to be used at home.

While the disclosure includes example embodiments with reference to specific matters such as specific components and limited example embodiments and drawings, the example embodiments described herein are to be considered as provided to help the overall understanding only. The example embodiments described herein are not for purposes of limitation, and it will be apparent to one of ordinary skill in the art that various changes in form and details may be made in these example embodiments Therefore, the scope of the disclosure is defined not by the detailed description, but by the claims and their equivalents, and all variations within the scope of the claims and their equivalents are to be construed as being included in the disclosure.

The invention claimed is:

1. A lumbar retractor comprising:

a first fixer configured to fix a thoracic region of a user;

a second fixer configured to fix a pelvic region of the user; and a connector disposed between the first fixer and the second fixer and configured to connect the first fixer and the second fixer, wherein a distance between the first fixer and the second fixer is adjustable as a length of the connector is changed, and the first fixer is configured to be capable of pressing, in an individually and respectively selectable manner, a plurality of segments of a thoracic vertebrae of the user, and further comprising:

an actuator disposed to connect a lower side of the first fixer and a lower side of the second fixer, and a sensor configured to sense the length of the connector which is changed by extension of the distance between the first fixer and the second fixer by the actuator, wherein the lumbar retractor is configured to determine a time point when the length of the connector sensed by the sensor is no longer extended compared to the traction force of a predetermined value provided by the actuator as the time point when the user feels pain, and a controller is configured to reduce or stop the traction force by controlling an operation of the actuator when the time point when the user feels pain is determined by the lumbar retractor.

2. The lumbar retractor of claim 1, wherein the first fixer comprises:

a first base configured to support the thoracic vertebrae of the user;

a plurality of first tubes disposed on the first base and, when the user is properly engaged with the lumbar retractor are disposed respectively at positions corresponding to the plurality of segments of the thoracic vertebrae of the user; and a first belt configured to extend from both sides of the plurality of first tubes to fix an upper body of the user, wherein the plurality of first tubes are individually expandable or contractable by air pressure, respectively.

3. The lumbar retractor of claim 2, wherein the second fixer comprises:

a second base configured to support a pelvis of the user;

a plurality of second tubes disposed on the second base and, when the user is properly engaged with the lumbar retractor, are disposed respectively at positions corresponding to a left pelvis and a right pelvis of the user; and a second belt configured to extend from both sides of the plurality of second tubes to fix the pelvis of the user, wherein the plurality of second tubes are individually expandable or contractable by air pressure, respectively.

4. The lumbar retractor of claim 3, further wherein the controller is configured to during use of the lumbar retractor, control air pressure in the plurality of first tubes and the plurality of second tubes, wherein the controller is configured to be capable of:

pressing only a specific segment among the segments of the thoracic vertebrae of the user by expanding some of the plurality of first tubes and deflating the rest according to the user's selection; and controlling individually degrees of expansion of the plurality of second tubes disposed below the left pelvis and the right pelvis of the user, according to the user's selection.

5. The lumbar retractor of claim 1, further comprising:

a mover disposed at a lower side of the second fixer and configured to rotate against the ground to be able to move the lumbar retractor.

* * * * *